United States Patent [19]

Kyo et al.

[11] 4,254,242

[45] Mar. 3, 1981

[54] FIRE-RETARDANT RESIN COMPOSITION

[75] Inventors: Kayomon Kyo, Kyoto; Yasuhiko Asai; Haruo Kohyama, both of Uji, all of Japan

[73] Assignee: Unitika Ltd., Amagasaki, Japan

[21] Appl. No.: 910,048

[22] Filed: May 26, 1978

[30] Foreign Application Priority Data

May 30, 1977 [JP] Japan ................................ 52/63868

[51] Int. Cl.$^3$ ............................................. C08L 77/00
[52] U.S. Cl. ................................ 525/425; 260/45.7 R; 260/45.75; 260/45.75 B; 260/45.45 C; 260/45.95 G
[58] Field of Search .................. 260/857 PE; 525/425

[56] References Cited

U.S. PATENT DOCUMENTS

| | | | |
|---|---|---|---|
| 3,758,442 | 9/1973 | Shima | 260/857 PE |
| 4,035,333 | 7/1977 | Kamada | 260/857 PE |
| 4,052,481 | 10/1977 | Asahara | 260/857 PE |
| 4,111,892 | 9/1978 | Kamada | 525/425 |
| 4,171,330 | 10/1979 | Kyo et al. | 525/425 |

OTHER PUBLICATIONS

Aoyama, Toshikazu et al., Chemical Abstracts, vol. 85 (1976) No. 79095w Japan Kokai 76 62,838.

*Primary Examiner*—Paul Lieberman
*Attorney, Agent, or Firm*—Sughrue, Rothwell, Mion, Zinn and Macpeak

[57] ABSTRACT

A fire-retardant resin composition comprising
 (A) an aromatic copolyester derived from (1) a mixture of terephthalic acid and isophthalic acid and/or the functional derivatives thereof and (2) a bisphenol and/or the functional derivatives thereof;
 (B) a polyamide; and
 (C) an aromatic halogen compound; with component (C) being present in a higher concentration in component (A) than in component (B). Molded articles prepared from the resin composition have superior mechanical properties, thermal stability, chemical properties and fire retardancy.

25 Claims, No Drawings

FIRE-RETARDANT RESIN COMPOSITION

BACKGROUND OF THE INVENTION

1. Field of the Invention

This invention relates to a fire-retardant resin composition obtained by incorporating an aromatic halogen compound in a resin composition comprising an aromatic copolyester and a polyamide.

2. Description of the Prior Art

Japanese Patent Application (OPI) Nos. 4146/75 and 98765/77 disclose a resin composition comprising (A) an aromatic copolyester, and (B) a polyamide, which has superior moldability, mechanical properties, chemical properties, electrical properties and thermal stability, and which is expected to have a very wide range of applications as electric component parts, automobile parts and machine parts. However, the fire retardancy of this resin composition is not sufficient and increasing the fire retardancy of this resin composition has been strongly desired.

Methods heretofore suggested for rendering aromatic polyesters fire-retardant include, for example, a method which comprises incorporating a halogenated organic compound, titanium phosphate and antimony oxide into aromatic polyesters (e.g., as disclosed in Japanese patent application (OPI) No. 17556/77), and a method involving adding a halogenated phenol to the polymerization system (e.g., as disclosed in Japanese Pat. No. 7470/77).

Prior techniques for rendering polyamides fire-retardant include, for example, a method which involves using both a halogenated aliphatic hydrocarbon and a phosphoric acid ester with the polyamide (e.g., as disclosed in Japanese patent application (OPI) No. 19798/77), a method involving adding melamine to the polyamide (e.g., as disclosed in Japanese Pat. No. 1994/67), a method comprising adding isocyanuric acid to the polyamide (e.g., as disclosed in Japanese Pat. No. 105744/75), and a method which comprises adding an amide-type compound to the polyamide and treating the composition with water to prevent the fire retardant from bleeding out of the composition (e.g., as disclosed in Japanese patent application (OPI) No. 16581/77).

When the above-described fire retarding compounds are added to the resin composition composed of components (A) and (B) as set forth above, the thermal stability of the composition at the time of melting is poor, and the composition decomposes during processing, for example, on extrusion or injection molding, and the superior properties of the resin composition are markedly deteriorated. Alternatively, the fire retardants bleed out with time, or the fire retardancy imparted is not sufficient. Hence, it has been necessary to discover suitable fire retardants for such a resin composition.

It is also known that an aromatic halogen compound or a mixture of an aromatic halogen compound with antimony oxide can be added to a composition comprising an aromatic polyester, a polycabonate and/or a polyalkylene terephthalate to render the composition fire retardant (e.g., as disclosed in Japanese patent application (OPI) No. 69558/76).

A resin composition comprising (A) an aromatic copolyester, (B) a polyamide, (C) a polyalkylene phenylene ester or polyalkylene phenylene ester ether, and (D) an aromatic halogen compound is disclosed in a copending U.S. patent application No. 871,168 filed Jan. 20, 1978 (corresponding to Japanese patent applications Nos. 8347/77 and 8348/77), assigned to the assignee thereof.

It has now been found that by including a suitable amount of a specific aromatic halogen compound into a resin composition comprising (A) an aromatic copolyester and (B) a polyamide, fire retardancy can be achieved.

However, in order to obtain a resin composition having a high degree of fire retardancy (for example, a fire retardancy rank of 95 V-O of UL 94 stipulated by Underwriters Laboratories, U.S.A.), quite a large amount of the aromatic halogen compound must be added to the resin composition. A resin composition which contains a large amount of the aromatic halogen compound, in comparison with a resin compound which does not contain an aromatic halogen compound, tends to be decomposed when exposed to high temperatures, e.g., during extrusion molding, injection molding, etc. Furthermore, such a resin composition tends to have inferior impact characteristics. The reason for this is not clear, but it is due presumably to an interaction between the aromatic halogen compound and the polyamide or the lack of compatibility between them.

Thus, no technique is known which can render a resin composition comprising (A) an aromatic copolyester and (B) a polyamide fire-retardant while retaining thermal stability of the resin composition during molding and dynamic characteristics, of which impact characteristics are typical.

SUMMARY OF THE INVENTION

A first object of this invention is to increase the fire retardancy of a resin composition comprising an aromatic copolyester and a polyamide.

A second object of this invention is to render a resin composition comprising an aromatic copolyester and a polyamide fire retardant without deteriorating the superior thermal stability, moldability and mechanical properties of the composition.

These and other objects of the invention will become apparent from the following detailed description of the invention.

Extensive investigations have now been made to remove the above defects, and it has now been found that by including a suitable amount of a specific aromatic halogen compound in a resin composition composed of an aromatic copolyester and a polyamide, with the concentration of the aromatic halogen compound being higher in the aromatic copolyester than in the polyamide, a resin composition having a high level of fire retardancy and resistance to thermal decomposition and superior impact characteristics can be obtained. This discovery led to the accomplishment of the present invention.

According to the present invention, there is provided a fire-retardant resin composition comprising (A) an aromatic copolyester (hereinafter referred to as "PPES", for brevity) comprising the reaction product in about equimolar amounts of (1) terephthalic acid and isophthalic acid and/or the functional derivatives thereof (the terephthalic acid unit/isophthalic acid unit molar ratio being about 9:1 to about 1:9) and (2) a bisphenol of the following general formula [I]:

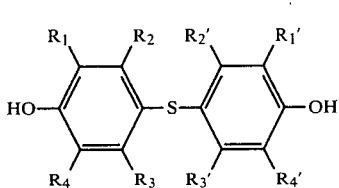

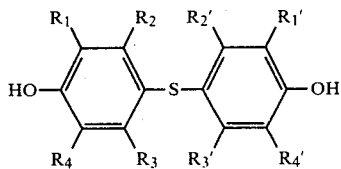

wherein —X— represents a member selected from the group consisting of —O—, —S—, —SO$_2$—, —SO—, —CO—, an alkylene group containing 1 to 5 carbon atoms, and an alkylidene group containing 1 to 5 carbon atoms, and R$_1$, R$_2$, R$_3$, R$_4$, R$_1'$, R$_2'$, R$_3'$ and R$_4'$, which may be the same or different, each is selected from the group consisting of a hydrogen atom, a chlorine atom, a bromine atom and an alkyl group containing 1 to 5 carbon atoms, and/or a derivative thereof.

(B) a polyamide (hereinafter referred to as "PA", for brevity) containing therein a repeating unit of the following general formula [II]:

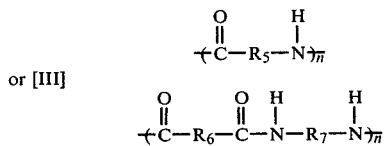

wherein R$_5$, R$_6$ and R$_7$, which may be the same or different, each represents an alkylene group containing 4 to 11 carbon atoms and n is an integer of from 30 to 500, and (C) an aromatic halogen compound, with the amount of component (C) being 0.5 to 40% by weight based on the total amount of components (A), (B) and (C), and with component (C) being present in a higher concentration in component (A) than in component (B).

DETAILED DESCRIPTION OF THE INVENTION

It was surprising that the fire-retardant resin composition of this invention containing the aromatic halogen compound has superior fire retardancy. Further, it was unexpected that, by including the aromatic halogen compound in a larger concentration in component (A) than in component (B), the superior properties inherent to a resin composition comprising component (A) and component (B) are better retained than in the case where the aromatic halogen compound is present in a larger concentration in component (B) than in component (A), or in equal concentration in components (A) and (B), and that the resulting resin would also have better thermal stability during molding or better dynamic characteristics such as impact characteristics. Unexpectedly, it was also found that by including the aromatic halogen compound in a major proportion in component (A), the amount of the aromatic halogen compound required to render the resin composition fire-retardant can be relatively reduced. Since fire-retardant plastic materials generally have unsatisfactory dynamic characteristics and heat stability, the fire-retardant resin composition of this invention which has improved impact characteristics and thermal stability has high industrial value.

The PPES used in this invention is obtained from a mixture of terephthalic acid and isophthalic acid and/or the functional derivatives thereof (the terephthalic acid unit/isophthalic acid unit molar ratio being about 9:1 to about 1:9) and a bisphenol of the following general formula [I]:

wherein —X— is selected from the group consisting of —O—, —S—, —SO$_2$—, —SO—, —CO—, an alkylene group containing 1 to 5 carbon atoms and an alkylidene group containing 1 to 5 carbon atoms, and R$_1$, R$_2$, R$_3$, R$_4$, R$_1'$, R$_2'$, R$_3'$ and R$_4'$, which may be the same or different, each is selected from the group consisting of a hydrogen atom, a chlorine atom, a bromine atom and an alkyl group containing 1 to 5 carbon atoms, and/or a functional derivative thereof.

Suitable examples of alkylene groups of X containing 1 to 5 carbon atoms include a methylene group, an ethylene group, a propylene group, a tetramethylene group and a pentamethylene group. Suitable examples of alkylidene groups for X containing 1 to 5 carbon atoms include an ethylidene group, a propylidene group, an isopropylidene group, an isobutylidene group and a pentylidene group.

Suitable examples of alkyl groups for R$_1$ to R$_4$ and R$_1'$ and R$_4'$ containing 1 to 5 carbon atoms include a methyl group, an ethyl group, an isopropyl group, a tert-butyl group and a neopentyl group.

A mixture of about 90 to about 10 mole% of terephthalic acid and/or the functional derivatives thereof and about 10 to about 90 mole% of isophthalic acid and/or the functional derivatives thereof is used as an acid component to be reacted with the bisphenol to prepare the PPES used in this invention. Preferably, a mixture of 30 to 70 mole% of terephthalic acid and/or the functional derivatives thereof and 70 to 30 mole% of isophthalic acid and/or the functional derivatives thereof is used. PPES prepared from a bisphenol having the general formula [I] (hereinafter simply "bisphenol" for brevity) and a mixture of 50 mole% of terephthalic acid and/or the functional derivatives thereof and 50 mole% of isophthalic acid and/or the functional derivatives thereof is most preferred. The molar ratio of the bisphenol to the sum of the terephthalic acid units and isophthalic acid units is substantially equimolar, e.g., about 1:1, preferably 1:1.

Examples of functional derivatives of terephthalic or isophthalic acid which can be used in this invention include acid halides, dialkyl esters and diaryl esters. Preferred examples of acid halides include terephthaloyl dichloride, isophthaloyl dichloride, terephtaloyl dibromide and isophthaloyl dibromide. Preferred examples of dialkyl esters include dialkyl esters of these acids containing 1 to 6 (especially 1 to 2) carbon atoms in each alkyl moiety thereof. Preferred examples of diaryl esters include diphenyl terephthalate and diphenyl isophthalate.

Examples of suitable bisphenols which can be used are 4,4'-dihydroxy-diphenyl ether, bis(4-hydroxy-2-methylphenyl)ether, bis(4-hydroxy-3-chlorophenyl)ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenol)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 1,1-bis(4-hydroxyphenyl)-n-butane. 2,2-bis(4-hydroxyphenyl)propane, bisphenol A, is most typical, is easily available, and, accordingly, is most often used.

Typical examples of the functional derivatives of the bisphenol which can be used are the alkali metal salts and diesters thereof with aliphatic monocarboxylic acids containing 1 to 3 carbon atoms. Suitable examples of aliphatic monocarboxylic acids include formic acid, acetic acid, propionic acid, etc. Preferred functional derivatives of the biphenols are the sodium salts, the potassium salts, and the diacetate esters thereof. The bisphenol can be used either individually or as a mixture of two or more thereof.

In the preparation of the aromatic copolyester from terephthalic acid or isophthalic acid or the functional derivatives thereof and the bisphenol, at most 30 mole%, preferably at most 10 mole%, of a compound having a carbonate linkage such as diphenyl carbonate or an aliphatic glycol such as ethylene glycol, propylene glycol, tetramethylene glycol or neopentyl glycol may also be copolymerized therewith.

To produce the aromatic copolyester used in this invention, the interfacial polymerization method which comprises mixing a solution of an aromatic dicarboxylic acid chloride in a water-immiscible organic solvent with an alkaline aqueous solution of bisphenol, the solution polymerization method which comprises heating bisphenol and an acid chloride in an organic solvent, and the melt polymerization method which comprises heating a phenyl ester of an aromatic dicarboxylic acid and bisphenol, which are described in detail in U.S. Pat. Nos. 3,884,990 and 3,946,091, can, for example, be employed. The production of aromatic copolyesters is also described in detail in U.S. Pat. No. 4,052,481.

In order to insure good physical properties for the aromatic copolyesters used in this invention, they should have a logarithmic viscosity number ($\eta_{inh}$), defined by the following equation, of about 0.3 to about 1.0 preferably 0.4 to 0.8.

$$\eta_{inh} = \frac{\log_e t_1/t_2}{C}$$

wherein $t_1$ is the falling time (in seconds) of a solution of the aromatic copolyesters; $t_2$ is the falling time (in seconds) of the solvent; and C is the concentration (g/dl) of the aromatic copolyester in the solution. The logarithmic viscosity number used herein, is determined in a 1,1,2,2-tetrachloroethane-phenol mixture (weight ratio: 4:6) at 25° C.

The PA, one component of the resin composition of this invention, is a compound having therein a repeating unit represented by the following general formula [II]:

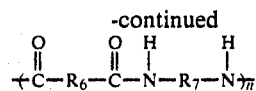

or [III]

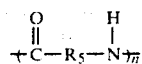

-continued

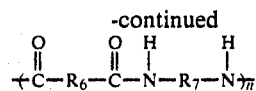

wherein $R_5$, $R_6$ and $R_7$, which may be the same or different, each represents an alkylene group having 4 to 11 carbon atoms, and n is an integer of 30 to 500. Some of the alkylene groups $R_5$, $R_6$ and $R_7$ may be replaced by aromatic groups, e.g.,

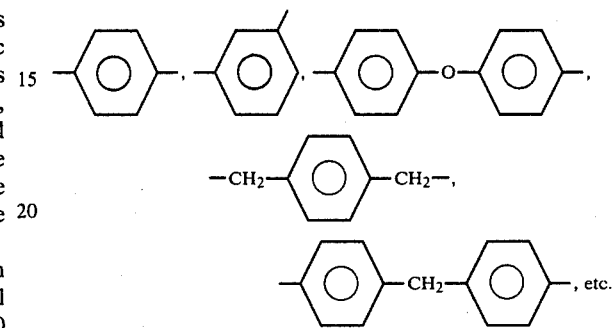

or alicyclic groups, e.g.,

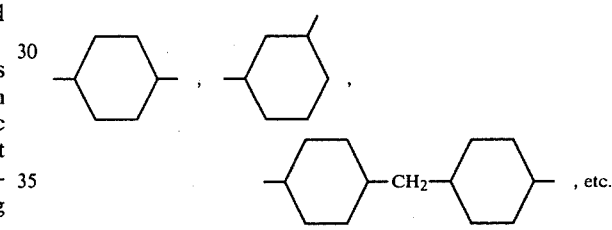

Suitable examples of alkylene groups containing 4 to 11 carbon atoms for $R_5$ to $R_7$ include a tetramethylene group, a pentamethylene group, a hexamethylene group, a heptamethylene group, an octamethylene group, a nonamethylene group, a decamethylene group, and an undecamethylene group.

Any PA which contains a repeating unit represented by either of the above general formulae [II] and [III] can be used in this invention and there is no further limitation. Preferred examples of the PA include polyhexamethylene adipamide, polycaprolactam, polyhexamethylene sebacamide, polydecamethylene adipamide, polyaminoundecanoic acid, and polylaurolactam.

Copolyamides can also be used as the PA in this invention. Examples of suitable copolyamides include a copolyamide derived from caprolactam and hexamethylene adipamide, and a copolyamide derived from caprolactam and hexamethylene sebacamide.

In the resin composition of the present invention, an aromatic halogen compound, component (C) is used as a fire retardant to render the resin composition fire retardant. Suitable aromatic halogen compounds which can be used as component (C) are aromatic halogen compounds which are stable at temperatures, e.g., about 230° to about 360° C., more generally about 250° to about 330° C., normally used to process the aromatic copolyester, component (A), in the molten state, yet decompose at the burning temperature of the resin composition and which have good compatibility with the PPES. One measure of compatibility is whether the aromatic halogen compound and the PPES form a transparent mixture when mixed in the molten state.

Examples of suitable aromatic halogen compounds having the above described characteristics are those of the general formulae [IV] to [VIII] given below.

Compounds of the general formula [IV]

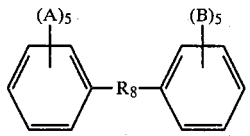
[IV]

wherein A and B, which may be the same or different, each represents a hydrogen atom, a chlorine atom or a bromine atom and at least one of each of A and B is a bromine atom or a chlorine atom, and $R_8$ represents —O—, —S—, —SO$_2$—, an alkylene group containing 1 to 5 carbon atoms or an alkylidene group containing 1 to 5 carbon atoms, each of which may be partially halogenated or each of which may contain at least one ether linkage in the chain thereof. Suitable examples of alkylene groups having 1 to 5 carbon atoms and alkylidene groups containing 1 to 5 carbon atoms are as described hereinbefore for X. Examples of compounds of the general formula [IV] which can be used include halogenated diphenyl ethers such as decabromodiphenyl ether, octabromodiphenyl ether, hexabromodiphenyl ether, pentabromodiphenyl ether, tetrabromodiphenyl ether, tribromodiphenyl ether, dibromodiphenyl ether, monobromodiphenyl ether, decachlorodiphenyl ether, octachlorodiphenyl ether, hexachlorodiphenyl ether, pentachlorodiphenyl ether, tetrachlorodiphenyl ether, trichlorodiphenyl ether, dichlorodiphenyl ether, and monochlorodiphenyl ether. Where any position isomers of these compounds exist, any and all position isomers are included within the scope of the above recited compounds and can be suitably employed in this invention (hereinafter the same).

Other compounds represented by the general formula [IV] are, for example, decabromodiphenyl sulfide, octabromodiphenyl sulfide, tetrachlorodiphenyl sulfide, tetrachlorodiphenyl sulfone, 3,5-dichloro-3',5'-dibromodiphenyl sulfone, 2,4-dichloro-3',4',5'-tribromodiphenylmethane, decachlorodiphenyl sulfone, decabromodiphenyl sulfone, bis(tribromophenoxy)-methylene, bis(tribromophenoxy)ethylene, and bis(pentabromophenoxy)ethylene.

Of the fire retardants of the general formula [IV], the halogenated diphenyl ethers, especially decabromodiphenyl ether, octabromodiphenyl ether and hexabromodiphenyl ether, the halogenated diphenyl sulfones, especially decabromodiphenyl sulfone, and the bis(halophenoxy)alkylenes, especially bis(pentabromophenoxy)ethylene, are preferred from the standpoint of the fire-retardancy effect, thermal stability, compatibility, and dynamic properties achieved.

Of these, decabromodiphenyl ether is the most preferred fire retardant because in addition to the superior properties described above, superior economy, heat distortion temperature, extrusion stability in extrusion together with PPES, and color are achieved.

Compunds of the general formula [V]

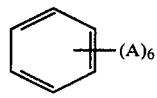
[V]

wherein A represents a hydrogen atom, a chlorine atom or a bromine atom and at least one A, preferably at least two A's, represents a chlorine atom or a bromine atom.

Examples of compounds of the general formula [V] which can be used are hexabromobenzene, hexachlorobenzene, tetrabromobenzene, tetrachlorobenzene, tribromobenzene and trichlorobenzene. Hexabromobenzene is especially suitable because it provides superior thermal stability and a high halogen content.

Compounds of the general formula [VI]

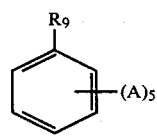
[VI]

wherein A represents a hydrogen atom, a chlorine atom or a bromine atom, and at least one A, preferably at least two A's, represents a chlorine atom or a bromine atom, and $R_9$ represents an alkyl group containing 1 to 5 carbon atoms or an alkenyl group containing 1 to 5 carbon atoms, each of which may be partially halogenated or each of which may contain at least one ether linkage in the chain. Suitable examples of alkyl groups containing 1 to 5 carbon atoms are as described hereinbefore for $R_1$ to $R_4$ and $R_1'$ and $R_4'$ and suitable examples of alkenyl groups containing 1 to 5 carbon atoms are an allyl group and a methallyl group.

Examples of compounds of the general formula [VI] which can be used are pentabromotoluene, pentachlorotoluene, pentabromoethyl benzene, pentabromophenyl allyl ether, 2,4,6-tribromophenyl methallyl ether, and 2,4,6-tribromophenyl-2-methyl-2,3-dibromopropyl ether. Pentabromotoluene and pentabromoethylbenzene are especially suitable.

Compounds of the general formula [VII]

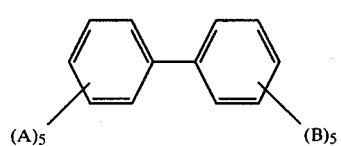
[VII]

wherein A and B, which may be the same or different, each represents a hydrogen atom, a chlorine atom or a bromine atom, and at least one of each of A and B is a bromine atom or a chlorine atom.

Examples of compounds of the general formula [VII] which can be used are hexachlorodiphenyl, hexabromodiphenyl, octabromodiphenyl, octachlorodiphenyl, decabromodiphenyl, and decachlorodiphenyl. Decabromodiphenyl is especially suitable.

Compounds of the general formula [VIII]

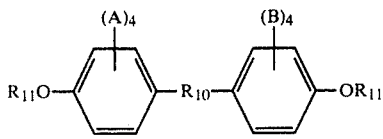

wherein A and B, which may be the same or different, each represents a hydrogen atom, a chlorine atom or a bromine atom and at least one of each of A and B is a bromine atom or a chlorine atom, $R_{10}$ represents —O—, —S—, —SO$_2$—, —CO—, an alkylene group containing 1 to 5 carbon atoms or an alkylidene group containing 1 to 5 carbon atoms, and $R_{11}$ represents a hydrogen atom, an alkyl group containing 1 to 5 carbon atoms or a hydroxyalkyl group containing 1 to 5 carbon atoms, each of which may be partially halogenated, and each of which may contain at least one ether linkage in the chain thereof. Suitable examples of alkylene groups containing 1 to 5 carbon atoms and alkylidene groups containing 1 to 5 carbon atoms for $R_{10}$ are as described hereinbefore for X. Suitable examples of alkyl groups for $R_{11}$ are as described hereinbefore for $R_1$ to $R_4$ and $R_1'$ to $R_4'$ and suitable examples of hydroxyalkyl groups for $R_{11}$ are a hydroxymethyl group, a 2-hydroxyethyl group, a 3-hydroxypropyl group, a 4-hydroxybutyl group, a 5-hydroxypentyl group or the like.

Examples of compounds of the general formula [VIII] which can be used include 2,2-bis(4-hydroxy-3,5-dibromophenyl)propane, 2,2-bis(4-hydroxyethoxy-3,5-dibromophenyl)propane, 2,2-bis[4(2',3'-dibromopropoxy)-3,5-dibromophenyl]propane, bis(4-hydroxy-3,5-dibromophenyl)sulfone, 2,2-bis(4-ethoxy-3,5-dichlorophenyl)propane, bis(4-hydroxy-3,5-dichlorophenyl)sulfone, and 2,2-bis(4-ethoxy-3,5-dibromophenyl)propane. bis(4-hydroxy-3,5-dibromophenyl)sulfone is especially suitable.

The aromatic halogen compounds may be used individually or as mixtures of two or more thereof.

The amount of the aromatic halogen compound as component (C) present in the resin composition composed of the aromatic copolyester (A) and the polyamide (B) to impart fire retardancy thereto is 0.5 to 40% by weight based on the total amount of components (A), (B) and (C). The especially preferred amount of the aromatic halogen compound is 2 to 30% by weight from the standpoint of fire retardancy and dynamic properties. When the amount of the aromatic halogen compound is within the above-specified range and the aromatic halogen compound is present in a higher concentration in component (A) than in component (B), the resulting fire-retardant composition retains quite well the superior mechanical properties which the resin composition composed of components (A) and (B) originally possesses. Especially advantageous results are obtained for impact characteristics and thermal stability at the time of molding when the aromatic halogen compound is present in component (A) in an amount which is at least 1.2, preferably at least 1.3, times by weight larger than the average amount of the aromatic halogen compound which is obtained when it is uniformly dispersed in components (A) and (B).

Of the fire-retardant resin composition of this inventions, those which comprise component (A), component (B) and the aromatic halogen compound (C), in amount of 20 to 78% by weight, 20 to 78% by weight, and 2 to 30% by weight, respectively, are especially preferred because the properties of the resin composition such as thermal stability, fire retardancy, dynamic, properties, chemical resistance and resistance to stress cracking are well balanced.

Any method can be used to incorporate the aromatic halogen compound (C) in a higher concentration into component (A) than into component (B) in the preparation of the fire-retardant resin composition of this invention. For example, the aromatic halogen compound can be dispersed in component (A) as uniformly as possible by adding the aromatic halogen compound during the polymerization of component (A), or by adding the aromatic halogen compound to a solution of a polymer of component (A) and stirring the mixture, or by melt-mixing the aromatic halogen compound with component (A). Then, component (B) is added, and by melt-kneading for example, component (B) and the composition composed of component (A) and the aromatic halogen compound are dispersed microscopically.

It is preferred for the aromatic halogen compound to be present in a high concentration in component (A) not only in the resin composition per se, but also in the molded articles ultimately obtained therefrom. Thus, it is not desirable to employ excessively high temperature and times in microscopically dispersing component (B) and the composition composed component (A) and the aromatic halogen compound, or at the time of forming molded articles from the resulting resin composition. Preferred conditions are therefore such that the migration of the aromatic halogen compound present in component (A) to component (B) is minimized, and component (B) and the composition composed of component (A) and the aromatic halogen compound will be dispersed as uniformly as possible.

The combined use of a fire-retarding assistant in the resin composition of this invention is preferred to promote the fire-retarding effect in accordance with this invention. Examples of suitable fire-retarding assistants that can be used in this invention are antimony sulfides such as Sb$_2$S$_3$ or Sb$_2$S$_5$, salts formed between antimony and alkali metals of Group I of the periodic table such as K$_3$Sb, Na$_3$Sb and Li$_3$Sb, antimony trioxide, zinc borate, barim meta-borate and zirconium oxide. Of these, antimony trioxide has an especially marked fire-retardancy promoting effect. In this case, the equivalent ratio of the halogen atom in the aromatic halogen compound in the fire-retardant resin composition of this invention to the antimony atom in the antimony compound preferably is within the range of from 20:1 to 2:1. When the equivalent ratio is within this range, the fire retardancy imparting effect is especially marked and even when a halodiphenyl ether or an antimony compound is included in a large quantity, the resulting resin composition retains superior mechanical properties, etc.

These fire-retardant assistants can be used either individually or as mixtures of two or more thereof. The fire retardant assistant may be present equally in both components (A) and (B), or in a larger amount in either of component (A) or (B).

The amount of the fire-retardant assistant which can be incorporated in the fire-retardant resin composition is 5 to 100% by weight based on the amount of the aromatic halogen compound (C).

If desired, to improve the thermal stability of the resin composition of this invention, various thermal stabilizers such as metallic compounds, phosphorus compounds, and hindered phenols can be added thereto. When cuprous chloride (or cuprous iodide) and 2-mercaptobenzimidazole are added together to the resin composition, the most improved thermal stability is obtained. Usually the thermal stabilizers are used in an amount of about 0.01 to about 5% by weight based on the weight of the fire retardant resin composition.

Various weather resisting agents can be added to the resin composition of this invention to improve the weather-ability thereof. Examples of suitable weather resisting agents include benzotriazole derivatives and benzophenone derivatives. Particularly preferred examples of these compounds are 2-(2'-hydroxy-5'-methylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, etc. Usually the weather resisting agent is used in an amount of about 0.01 to about 5% by weight based on the weight of the fire retardant resin composition.

A phosphorus compound such as an orthophosphoric acid ester, an acid orthophosphoric acid ester, orthophosphoric acid, a phosphorous acid ester, an acid phosphorous acid ester or phosphorous acid, when added in an amount of 0.01 to 0.5% by weight based on the total weight of the fire-retardant resin composition, produces good results as a coloration inhibitor. The phosphorus compound may be used in combination with an epoxy compound, a compound composed of an organic carboxylic acid and an alkali metal, or a compound composed of an organic carboxylic acid and an alkaline earth metal. Representative examples of the epoxy compounds which can be used are 1,2,3,4-diepoxybutane and the diglycidyl ether of bisphenol A, representative examples of the organic carboxylic acids which can be employed are acetic acid and stearic acid, representative examples of the alkali metal salts of organic carboxylic acids which are suitable are sodium acetate and potassium stearate, and representative examples of the alkaline earth metal salts of organic carboxylic acids which can be utilized are calcium maleate and magnesium stearate, all being added in an amount of about 0.01 to about 5% by weight based on the total weight of the fire retardant resin composition.

If desired, ordinary reinforcing fillers, such as glass fibers, inorganic silicates, silica, quartz, silica gel, carbon fibers, cristobalite, asbestos, clay or talc, may also be incorporated in the fire-retardant resin composition of this invention. A suitable amount of these reinforcing fillers range from about 1 to about 50% by weight based on the weight of the fire retardant resin composition.

Furthermore, in order to further improve the mechanical properties, such as impact strength or elongation at break, of the fire-retardant resin composition of this invention, it is possible to add a rubber such as acrylonitrile-butadiene rubber or styrene-butadiene rubber, an acrylonitrile/butadiene/styrene (ABS) resin, a polycarbonate, polyethylene, polypropylene, a polyurethane, polystyrene, EVA copolymers, poly(acrylates), polytetrafluoroethylene, or poly(methyl methacrylate) to the resin composition. A suitable amount of these rubbers or polymer materials which can be used is about 1 to about 30% by weight, preferably about 1 to about 10% by weight, based on the weight of the fire-retardant resin composition.

The fire-retardant resin composition of this invention can be used in the form of powders, chips, etc., which can be molded into various useful molded articles by compression molding, injection molding, extrusion molding and the like using conventional molding processes. Examples of molded articles which can be produced include gears, bearings, electrical component parts, containers and various other articles which are used widely in those fields where engineering plastics of high quality are required.

The following examples are given to illustrate this invention in greater detail. These examples should be considered, however, as merely exemplary and non-limiting. Unless otherwise indicated herein, all parts, percents, ratios and the like are by weight.

The amount of the aromatic halogen compound (C) present in the fire-retardant resin compositions described herein was measured in the following manner.

When the amount of component (B) in the resin composition is smaller than the amount of component (A) in the resin composition, a molded article of the resin composition is shaved to obtain shavings as thin as possible, and the shavings are put into methylene chloride in a concentration of 1 g/100 cc. The mixture is heated with hot water and sufficiently stirred. During this stage, component (A) and component (C) present in component (A) are extracted, but component (B) and component (C) present in component (B) which is not soluble in methylene chloride remain unextracted. After thorough stirring, the solid matter and the solution are separated from each other using a glass filter. The solution is cast into a watch glass and the methylene chloride is evaporated to form a film. Since this film is believed to contain component (A) and component (C) contained in component (A), the concentration of component (C) in component (A) is determined by analyzing this film. On the basis of this result, the concentration of component (C) in component (B) is calculated.

When the amount of component (B) in the resin composition is larger than the amount of component (B) in the resin composition, methylene chloride cannot be used to fully extract component (A) and component (C) present in component (A). Thus, a molded article of the resin composition is first suspended in a 90% by weight formic acid aqueous solution, and then the formic acid is evaporated to form a film. This film is treated with methylene chloride in the same way as described above to extract the component (A) and the component (C) contained in component (A). It has been confirmed that by treatment with formic acid, the concentration of component (C) in component (A) does not vary, and that when this method is used, component (C) has a sufficiently low solubility in methylene chloride or in formic acid. The measurement of the concentration of the component (C) in the film of components (A) and (C) was performed by the halogen analysis method of JIS K-0107 after separating halogen by an oxygen flask combustion method [Onoe, *Bunseki Kagaku* (Analytical Chemistry), May 1963, Kobayashi, Suzuki and Araki, ibid. April 1964].

EXAMPLES 1 AND 2 AND COMPARATIVE EXAMPLES 1 TO 3

A methylene chloride solution (292 kg) of 10 kg of terephthaloyl dichloride and 10 kg of isophthaloyl dichloride was mixed with 450 kg of an aqueous sodium hydroxide solution of 23 kg of bisphenol A, and an aromatic copolyester was produced using an interfacial polymerization method. The copolyester had a logarithmic viscosity number [$\eta_{inh}$], determined at 25° C. in a phenol/tetrachloroethane mixture (weight ratio 6:4) in a concentration of 1 g/dl, of 0.75.

A polyamide, nylon 6 (a product of Unitika Limited; having a logarithmic viscosity number at 25° C. in a phenol/tetrachloroethane solvent (weight ratio 6:4) in a concentration of 1 g/100 cc of 1.02), decabromodiphenyl ether (hereinafter DBDE) and antimony trioxide were also used.

The materials described above according to the formulations shown in Table 1 below, dried at 100° C. for 16 hours, were preliminarily blended under the extruding conditions shown in Table 1 below to produce chips U-1, U-2 and U-3. At this stage, chips U-1, U-2 and U-3 all showed a good extruding condition, and their appearance was good.

The materials shown in Table 2 above were added to chips U-1 and U-2, respectively, and after drying at 100° C. for 16 hours, the composition obtained was again extruded into chips. As shown in Table 2, it was found that the extruding condition was good in Examples 1 and 2, but in Comparative Examples 1 and 2, a tendency toward decomposition was observed at higher temperature, and a tendency toward poor kneading was observed at lower temperature.

When the extrusion was performed in Examples 1 and 2 at a higher temperature as in Comparative Examples 1 and 2, the vigorous decomposition as observed in Comparative Examples 1 and 2 was not noted, and the resin compositions were more thermally stable.

Each of these chips was dried at 100° C. for 16 hours, and injection-molded into rod-like test samples and tensile impact test samples at a mold temperature of 70° C. and an injection pressure of 1000 kg/cm$^2$ while maintaining the temperature of the cylinder at 250° C. The dynamic characteristics, combustion characteristics, thermal decomposition characteristics and the concentration of component (C) in component (A) of the samples were measured. The results obtained are shown in Table 3 below.

TABLE 1

| Chips | Composition (parts by weight) | | | | Extrusion Temperature (°C.) | Appearance of Chips |
|---|---|---|---|---|---|---|
| | Material (1) | | Material (2) | | | |
| | Type | Amount | Type | Amount | | |
| U-1 | PAR | 42 | DBDE | 12 | 260 | Good, transparent |
| U-2 | N6 | 42 | DBDE | 12 | 230 | Good, non-transparent |
| U-3 | PAR | 42 | N6 | 42 | 280 | Good, non-transparent |

Note:
PAR: Aromatic copolyester
N6: Nylon 6
DBDE: Decabromodiphenyl ether

TABLE 2

| Example No. | Composition (parts by weight) | | | | | | Extrusion Temperature (°C.) | Extrusion Condition |
|---|---|---|---|---|---|---|---|---|
| | Material (1) | | Material (2) | | Material (3) | | | |
| | Type | Amount | Type | Amount | Type | Amount | | |
| Example 1 | U-1 | 54 | N6 | 42 | — | — | 230 | Good |
| Example 2 | U-1 | 54 | N6 | 42 | Sb$_2$O$_3$ | 4 | 230 | Good |
| Comparative Example 1 | U-2 | 54 | PAR | 42 | — | — | (1) 270 (2) 230 | (1) Vigorous decomposition (2) Poor kneading |
| Comparative Example 2 | U-2 | 54 | PAR | 42 | Sb$_2$O$_3$ | 4 | (1) 270 (2) 230 | (1) Vigorous decomposition (2) Poor kneading |

TABLE 3

| Example No. | Amount of Flex at Flexural Breakage[1] (mm) | Tensile Impact Strength[2] (kg·cm/cm$^2$) | Burning Rank[3] | DTG Peak Temperature[4] (°C.) | Appearance of Molded Article[5] | (C)[6] (A) + (C) (wt.%) | (C)[7] (A) + (B) + (C) (wt.%) |
|---|---|---|---|---|---|---|---|
| Example 1 | 47< | 100 | V-2 | 384 | Good | 20 | 12.5 |
| Example 2 | 47< | 95 | V-0 | 380 | Good | 18 | 12.5 |
| Comparative Example 1 | 10 | 25 | V-2 | 350 | Scorching occurred | 4 | 12.5 |
| Comparative Example 2 | 7 | 25 | V-0 | 347 | Scorching occurred | 5 | 12.5 |
| Comparative | 47< | 110 | HB | 384 | Good | 0 | 0 |

TABLE 3-continued

| Example No. | Amount of Flex at Flexural Break-age[1] (mm) | Tensile Impact Strength[2] (kg·cm/cm²) | Burning Rank[3] | DTG Peak Temperature[4] (°C.) | Appearance of Molded Article[5] | (C)[6] (A) + (C) (wt.%) | (C)[7] (A) + (B) + (C) (wt.%) |
|---|---|---|---|---|---|---|---|
| Example 3 | | | | | | | |

[1]:A sample of a size of 5 × ½ × ⅛ inch was used. Flexural stress was applied to the center of the sample supported by two fulcra at ends of the sample with the distance between the fulcra being set at 10 cm, and the amount of flex until the sample broke was measured. When the amount of flex exceeded 47 mm, the sample was no longer suspended between the fulcra.
[2]:Measured in accordance with ASTM D-1822
[3]:UL Standard No. 94; a test piece having a thickness of 1/16 inch was used.
[4]:A differential thermal balance made by Rigaku Denki Kabushiki Kaisha was used. The temperature heating rate was 10° C./min.
[5]:The appearance was visually evaluated.
[6]:Concentration of component (C) in component (A) measured in accordance with the method described hereinabove.
[7]:Concentration of component (C) when it was assumed that component (C) was distributed uniformly throughout the composition.
Comparative Example 3: A molded article produced from chip U-3 was used.

As is shown by the results in Table 3, when a major proportion of component (C) is present in component (B), the resulting resin compositions have poor dynamic properties and thermal stability.

EXAMPLES 3 TO 5 AND COMPARATIVE EXAMPLES 4 AND 5

The same PAR and N6 as described in Examples 1 and 2 were used, and each of the compositions having the formulations shown in Table 4 was preliminarily extruded into chips.

TABLE 4

| Chips | Material (1) Type | Amount | Material (2) Type | Amount | Extrusion Temperature (°C.) | Appearance of Chips |
|---|---|---|---|---|---|---|
| U-4 | PAR | 42 | DBS | 12 | 260 | Good, transparent |
| U-5 | PAR | 42 | DBB | 12 | 260 | Good, transparent |
| U-6 | N6 | 42 | DBS | 12 | 230 | Good, transparent |
| U-7 | N6 | 42 | DBB | 12 | 230 | Good, transparent |

DBS:Decabromodiphenyl sulfone
DBB:Decabromodiphenyl

The resulting chips were each melt-extruded in accordance with the formulations shown in Table 5 below

TABLE 5

| Example No. | Material (1) Type | Amount | Material (2) Type | Amount | Material (3) Type | Amount | Material (4) Type | Amount | Extrusion Temperature (°C.) |
|---|---|---|---|---|---|---|---|---|---|
| Example 3 | U-4 | 54 | N6 | 42 | Sb₂O₃ | 4 | — | — | 245 |
| Example 4 | U-5 | 54 | N6 | 42 | Sb₂O₃ | 4 | — | — | 245 |
| Comparative Example 4 | U-6 | 54 | PAR | 42 | Sb₂O₃ | 4 | — | — | 245 |
| Comparative Example 5 | U-7 | 54 | PAR | 42 | Sb₂O₃ | 4 | — | — | 245 |
| Example 5 | U-1 | 54 | N6 | 42 | Sb₂O₃ | 4 | CB | 1 | 245 |

CB:Carbon black

In the same manner as in Examples 1 and 2, these chips were injection-molded, and the properties of the molded articles were evaluated. The results obtained are shown in Table 6.

TABLE 6

| Example No. | Amount of Flex at Flexural Breakage (mm) | Tensile Impact Strength (kg·cm/cm²) | Burning Rank | DTG Peak Temperature (°C.) | (C) (A) + (C) (wt.%) | (C) (A) + (B) + (C) (wt.%) |
|---|---|---|---|---|---|---|
| Example 3 | 40 | 90 | V-0 | 380 | 19 | 12.5 |
| Example 4 | 42 | 90 | V-0 | 382 | 18 | 12.5 |
| Comparative Example 4 | 8 | 20 | V-0 | 245 | 6 | 12.5 |
| Compara- | 5 | 25 | V-0 | 350 | 5 | 12.5 |

TABLE 6-continued

| Example No. | Amount of Flex at Flexural Breakage (mm) | Tensile Impact Strength (kg . cm/cm²) | Burning Rank | DTG Peak Temperature (°C.) | (C) (A) + (C) (wt.%) | (C) (A) + (B) + (C) (wt.%) |
|---|---|---|---|---|---|---|
| tive Example 5 Example 5 | 38 | 75 | V-0 | 383 | 18 | 11.9 |

In Examples 3 to 5, the dynamic characteristics of the resulting resin compositions were improved by inclusion of component (C) in a higher concentration in component (A) than in component (B), and these resin compositions tended to be resistant to thermal decomposition.

EXAMPLES 6 TO 12

The same PAR and N6 as described in Examples 1 and 2 were used, and each of the compositions having the formulations shown in Table 7 below were preliminarily extruded into chips.

Then, in accordance with the formulations shown in Table 8 below, each of these chips was melt-extruded into chips.

Molded articles were prepared from the resulting chips in the same way as in Examples 1 and 2, and their properties evaluated. The results obtained are shown in Table 9 below.

As can be seen from the results in Table 9, bis(tribromophenoxy)ethylene in Example 8 gave the best result of Examples 7 to 13.

TABLE 8

| Example No. | Composition (parts by weight) | | | | | | Extrusion Temperature (°C.) |
|---|---|---|---|---|---|---|---|
| | Material (1) | | Material (2) | | Material (3) | | |
| | Type | Amount | Type | Amount | Type | Amount | |
| 6 | U-8 | 56 | N6 | 40 | Sb₂O₃ | 4 | 240 |
| 7 | U-9 | " | " | " | " | " | " |
| 8 | U-10 | " | " | " | " | " | " |
| 9 | U-11 | " | " | " | " | " | " |
| 10 | U-12 | " | " | " | " | " | " |
| 11 | U-13 | " | " | " | " | " | " |
| 12 | U-14 | " | " | " | " | " | " |

TABLE 9

| Example No. | Amount of Flex at Flexural Breakage (mm) | Tensile Impact Strength (kg . cm/cm²) | Burning Rank | DTG Peak Temperature (°C.) | (C) (A) + (C) (wt.%) | (C) (A) + (B) + (C) (wt.%) |
|---|---|---|---|---|---|---|
| 6 | 40 | 75 | V-0 | 378 | 23 | 16.7 |
| 7 | 42 | 70 | V-0 | 375 | 24 | 16.7 |
| 8 | 45 | 80 | V-0 | 380 | 26 | 16.7 |
| 9 | 30 | 45 | V-0 | 376 | 26 | 16.7 |
| 10 | 33 | 55 | V-0 | 376 | 24 | 16.7 |
| 11 | 30 | 55 | V-0 | 374 | 25 | 16.7 |
| 12 | 35 | 50 | V-0 | 370 | 23 | 16.7 |

TABLE 7

| Chips | Composition (parts by weight) | | | | Extrusion Temperature (°C.) | Appearance of Chips |
|---|---|---|---|---|---|---|
| | Material (1) | | Material (2) | | | |
| | Type | Amount | Type | Amount | | |
| U-8 | PAR | 40 | OBD | 16 | 260 | Good, transparent |
| U-9 | PAR | 40 | HBD | 16 | 260 | Good, transparent |
| U-10 | PAR | 40 | BTB | 16 | 260 | Good, transparent |
| U-11 | PAR | 40 | HBB | 16 | 260 | Good, transparent |
| U-12 | PAR | 40 | PBT | 16 | 260 | Good, transparent |
| U-13 | PAR | 40 | PBE | 16 | 260 | Good, transparent |
| U-14 | PAR | 40 | BHS | 16 | 260 | Good, transparent |

OBD: Octabromodiphenyl ether
HBD: Hexabromodiphenyl ether
BTB: bis(Tribromophenoxy)ethylene
HBB: Hexabromobenzene
PBT: Pentabromotoluene
PBE: Pentabromoethylbenzene
BHS: bis(4-Hydroxy-3,5-dibromophenyl)sulfone

EXAMPLES 13 TO 15 AND COMPARATIVE EXAMPLES 6 TO 8

The same PAR and N6 as described in Examples 1 and 2 and polyhexamethylene adipamide (N66) [$\eta_{inh}$ 1.20; 25° C. in phenol/tetrachloroethane (wt.ratio 6:4)] were used, and each of the compositions was preliminarily extruded into chips in accordance with the formulations shown in Table 10.

TABLE 10

| Chips | Composition (parts by weight) | | | | Extrusion Temperature (°C.) | Appearance of Chips |
|---|---|---|---|---|---|---|
| | Material (1) | | Material (2) | | | |
| | Type | Amount | Type | Amount | | |
| U-15 | PAR | 50.4 | DBDE | 12 | 260 | Good, transparent |
| U-16 | PAR | 33.6 | DBDE | 12 | 260 | Good, transparent |

Then, the chips were melt-extruded in accordance with the formulations shown in Table 11 to form chips.

TABLE 11

| Example No. | Material (1) Type | Material (1) Amount | Material (2) Type | Material (2) Amount | Material (3) Type | Material (3) Amount | Extrusion Temperature (°C.) |
|---|---|---|---|---|---|---|---|
| 13 | U-1 | 54 | N66 | 42 | Sb$_2$O$_3$ | 4 | 260 |
| 14 | U-15 | 62.4 | N6 | 33.6 | " | " | 250 |
| 15 | U-16 | 45.6 | N6 | 50.4 | " | " | 230 |

The chips were injection-molded in the same way as in Examples 1 and 2. The properties of the molded articles were tested and the results obtained are shown in Tables 12 and 13 below.

TABLE 12

| Example No. | Amount of Flex at Flexural Breakage (mm) | Tensile Impact Strength (kg.cm/cm$^2$) | Burning Rank | DTG Peak Temperature (°C.) | (C) (A) + (C) (wt. %) | (C) (A) + (B) + (C) (wt. %) |
|---|---|---|---|---|---|---|
| 13 | 38 | 65 | V-0 | 378 | 18 | 12.5 |
| 14 | 47< | 85 | V-0 | 382 | 15.5 | 12.5 |
| 15 | 47< | 90 | V-0 | 380 | 22 | 12.5 |

TABLE 13

| Example No. | Tensile Strength (kg/cm$^2$) | Heat Distortion Temperature (*) (°C.) | Change in Appearance when Immersed in Toluene | Remarks |
|---|---|---|---|---|
| Example 13 | 980 | 147 | No change | PAR:N66 = 5:5** |
| Example 14 | 930 | 144 | No change | PAR:N6 = 6:4 |
| Example 2 | 940 | 138 | No change | PAR:N6 = 5:5 |
| Example 15 | 890 | 136 | No change | PAR:N6 = 4:6 |
| Comparative Example 6 | 720 | 170 | Dissolved | PAR |
| Comparative Example 7 | 820 | 60 | No change | N6 |
| Comparative Example 8 | 840 | 64 | No change | N66 |

(*): Under a load of 18.6 kg/cm$^2$
(**): Ratio by weight

The results in Table 12 show that in using N66 instead of N6, good dynamic properties were obtained although they were somewhat poorer than the results obtained in using N6.

Table 13 also gives the results of a comparison of the properties of the fire-retardant resin compositions of this invention with those of compositions which contained PAR, N6 and N66 alone. It can be seen that the fire-retardant resin compositions of this invention retained good dynamic properties, heat distortion temperatures and organic solvent resistance.

EXAMPLES 16 TO 20 AND COMPARATIVE EXAMPLES 9 TO 13

The same PAR and N6 as described in Examples 1 and 2 were used, and each of the compositions was preliminarily extruded into chips in accordance with the formulations shown in Table 14.

TABLE 14

| Chips | Material (1) Type | Material (1) Amount | Material (2) Type | Material (2) Amount | Extrusion Temperature (°C.) | Appearance of Chips |
|---|---|---|---|---|---|---|
| U-17 | PAR | 44 | DBDE | 9 | 260 | Good, transparent |
| U-18 | " | 43 | " | 10 | " | Good, transparent |
| U-19 | " | 41 | " | 14 | " | Good, transparent |
| U-20 | " | 40 | " | 16 | " | Good, transparent |
| U-21 | N6 | 44 | DBDE | 8 | 230 | Good, non-transparent |
| U-22 | " | 43 | " | 10 | " | Good, non-transparent |
| U-23 | " | 41 | " | 14 | " | Good, non-transparent |
| U-24 | " | 40 | " | 16 | " | Good, non-transparent |

The chips were then melt-extruded in accordance with the formulations shown in Table 15.

TABLE 15

| Example No. | Material (1) Type | Material (1) Amount | Material (2) Type | Material (2) Amount | Material (3) Type | Material (3) Amount | Extrusion Temperature (°C.) | Extrusion Condition |
|---|---|---|---|---|---|---|---|---|
| Example 16 | U-17 | 52 | N6 | 44 | Sb₂O₃ | 4 | 230 | Good |
| Example 17 | U-18 | 53 | " | 43 | " | " | " | " |
| Example 18 | U-19 | 55 | " | 41 | " | " | " | " |
| Example 19 | U-20 | 56 | " | 40 | " | " | " | " |
| Comparative Example 9 | U-21 | 52 | PAR | 44 | " | " | " | Kneading poor |
| Comparative Example 10 | U-22 | 53 | " | 43 | " | " | " | Kneading poor |
| Comparative Example 11 | U-23 | 55 | " | 41 | " | " | " | Kneading poor |
| Comparative Example 12 | U-24 | 56 | " | 40 | " | " | " | Kneading poor |

The resulting chips were injection-molded in the same way as in Examples 1 and 2, and the burning characteristics of the resulting molded articles were tested. The results obtained are shown in Table 16.

TABLE 16

| Example No. | Burning Rank | (C) (A) + (C) (wt.%) | (C) (A) + (B) + (C) (wt.%) |
|---|---|---|---|
| Example 16 | V-2 | 13 | 8.3 |
| Example 17 | V-0 | 15 | 10.4 |
| Example 2 | V-0 | 18 | 12.5 |
| Example 18 | V-0 | 20 | 14.6 |
| Example 19 | V-0 | 24 | 16.7 |
| Comparative Example 9 | V-2 | 3 | 8.3 |
| Comparative Example 10 | V-2 | 3 | 10.4 |
| Comparative Example 2 | V-2 | 5 | 12.5 |
| Comparative Example 11 | V-2 | 5 | 14.6 |
| Comparative Example 12 | V-0 | 6 | 16.7 |

It can be seen from the results in Table 16 that according to the process of this invention, the fire retarding effect can be achieved with lesser amounts of fire retarding agents.

While the invention has been described in detail and with reference to specific embodiments thereof, it will be apparent to one skilled in the art that various changes and modifications can be made therein without departing from the spirit and scope thereof.

What is claimed is:

1. A fire-retarding resin composition comprising
(A) an aromatic copolyester comprising the reaction product in about equimolar amounts of
  (1) a mixture of terephthalic acid and isophthalic acid and/or the functional derivatives thereof with the terephthalic acid unit to the isophthalic acid unit molar ratio being about 9:1 to about 1:9 and
  (2) a bisphenol of the general formula [I]

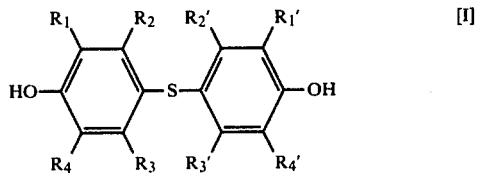

wherein —X— represents a member selected from the group consisting of —O—, —S—, —SO₂, —CO—, an alkylene group containing 1 to 5 carbon atoms and an alkylidene group containing 1 to 5 carbon atoms, and $R_1$, $R_2$, $R_3$, $R_4$, $R_1'$, $R_2'$, $R_3'$ and $R_4'$, which may be the same of different, each is selected from the group consisting of a hydrogen atom, a chlorine atom, a bromine atom and an alkyl group containing 1 to 5 carbon atoms, and/or a derivative thereof;

(B) a polyamide containing therein a repeating unit of the general formula [II]:

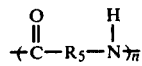

or [III]

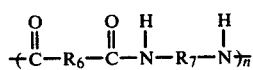

wherein $R_5$, $R_6$ and $R_7$, which may be the same or different, each represents an alkylene group containing 4 to 11 carbon atoms and n is an integer of from 30 to 500, and (C) an aromatic halogen compound, with the amount of component (C) being 0.5 to B 40% by weight based on the total amount of components (A), (B) and (C), and with component (C) being present in a higher concentration in component (A) than in component (B), wherein component (C) is present in component (A) in an amount of at least 1.2 times by weight larger than the average concentration of component (C) when component (C) is dispersed uniformly in components (A) and (B).

2. The composition of claim 1, wherein the bisphenol of the general formula [I] is 2,2-bis(4-hydroxyphenyl)-propane.

3. The composition of claim 1, wherein the polyamide (B) is polycaprolactam.

4. The composition of claim 1, wherein the polyamide (B) is polyhexamethylene adipamide.

5. The composition of claim 1, wherein the aromatic halogen compound (C) is a compound of the general formula [IV]:

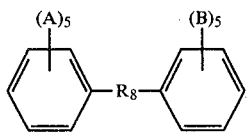

wherein A and B, which may be the same or different, each represents a hydrogen atom, a bromine atom or a chlorine atom, and at least one of each of A and B is a bromine atom or a chlorine atom, $R_8$ is —O—, —S—, —SO$_2$—, an alkylene group containing 1 to 5 carbon atoms or an alkylidene group containing 1 to 5 carbon atoms, each of which may be partially halogenated, and each of which may contain at least one ether linkage in the chain thereof.

6. The composition of claim 5, wherein the compound of the general formula [IV] is a halogenated diphenyl ether.

7. The composition of claim 6, wherein the halogenated diphenyl ether is decabromodiphenyl ether.

8. The composition of claim 6, wherein the halogenated diphenyl ether is octabromodiphenyl ether.

9. The composition of claim 6, wherein the halogenated diphenyl ether is hexabromodiphenyl ether.

10. The composition of claim 5, wherein the compound of the general formula [IV] is a halogenated diphenyl sulfone.

11. The composition of claim 10, wherein the halogenated diphenyl sulfone is decabromodiphenyl sulfone.

12. The composition of claim 5, wherein the compound of the general formula [IV] is bis(tribromophenoxy)ethylene.

13. The composition of claim 1, wherein the aromatic halogen compound (C) is a compound of the general formula [V]:

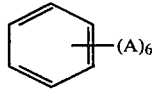

wherein A represents a hydrogen atom, a bromine atom or a chlorine atom, at least one A is a bromine atom or a chlorine atom and wherein the A's may be the same or different.

14. The composition of claim 13, wherein the compound of the general formula [V] is hexabromobenzene.

15. The composition of claim 1, wherein the aromatic halogen compound (C) is a compound of the general formula [VI]:

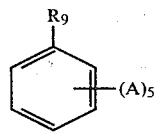

wherein A represents a hydrogen atom, a bromine atom or a chlorine atom, at least one A is a bromine atom or a chlorine atom and the A's may be the same or different, and $R_9$ is an alkyl group having 1 to 5 carbon atoms or an alkenyl group having 1 to 5 carbon atoms, each of which may be partially halogenated, and each of which may contain at least one ether linkage in the chain thereof.

16. The composition of claim 15, wherein the compound of the general formula [VI] is pentabromotoluene.

17. The composition of claim 15, wherein the compound of the general formula [VI] is pentabromoethylbenzene.

18. The composition of claim 1, wherein the aromatic halogen compound (C) is a compound of the general formula [VII]:

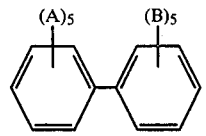

wherein A and B, which may be the same or different, each represents a hydrogen atom, a bromine atom or a chlorine atom and at least one of each of A and B is a bromine atom or a chlorine atom.

19. The composition of claim 18, wherein the compound of the general formula [VII] is decabromodiphenyl.

20. The composition of claim 1, wherein the aromatic halogen compound (C) is a compound of the general formula [VIII]:

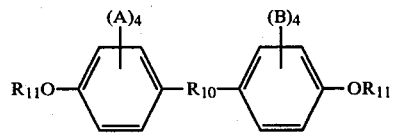

wherein A and B, which may be the same or different, each represents a hydrogen atom, a bromine atom or a chlorine atom and at least one of each of A and B is a bromine atom or a chlorine atom, $R_{10}$ represents —O—, —S—, —SO$_2$—, —CO—, an alkylene group containing 1 to 5 carbon atoms or an alkylidene group containing 1 to 5 carbon atoms, and $R_{11}$ represents a hydrogen atom, an alkyl group containing 1 to 5 carbon atoms or a hydroxyalkyl group containing 1 to 5 carbon atoms, each of which may be partially halogenated, and each of which may contain at least one ether linkage in the chain thereof.

21. The composition of claim 20, wherein the compound of the general formula [VIII] is bis(4-hydroxy-3,5-dibromophenyl)sulfone.

22. The composition of claim 1, wherein the proportion of the aromatic halogen compound (C) is 2 to 30% by weight.

23. The composition of claim 1, wherein components (A), (B) and (C) are present in an amount of 20 to 78% by weight, 20 to 78% by weight, and 2 to 30% by weight, respectively, based on the total amount of components (A), (B) and (C).

24. The composition of claim 1, wherein component (C) is present in component (A) in an amount of at least 1.3 times by weight larger than the average concentration of component (C) when component (C) is dispersed uniformly in components (A) and (B).

25. The composition of claim 1, wherein said resin composition consists essentially of said aromatic copolyester (A), said polyamide (B) and said aromatic halogen compound (C).

* * * * *